Figure 1:
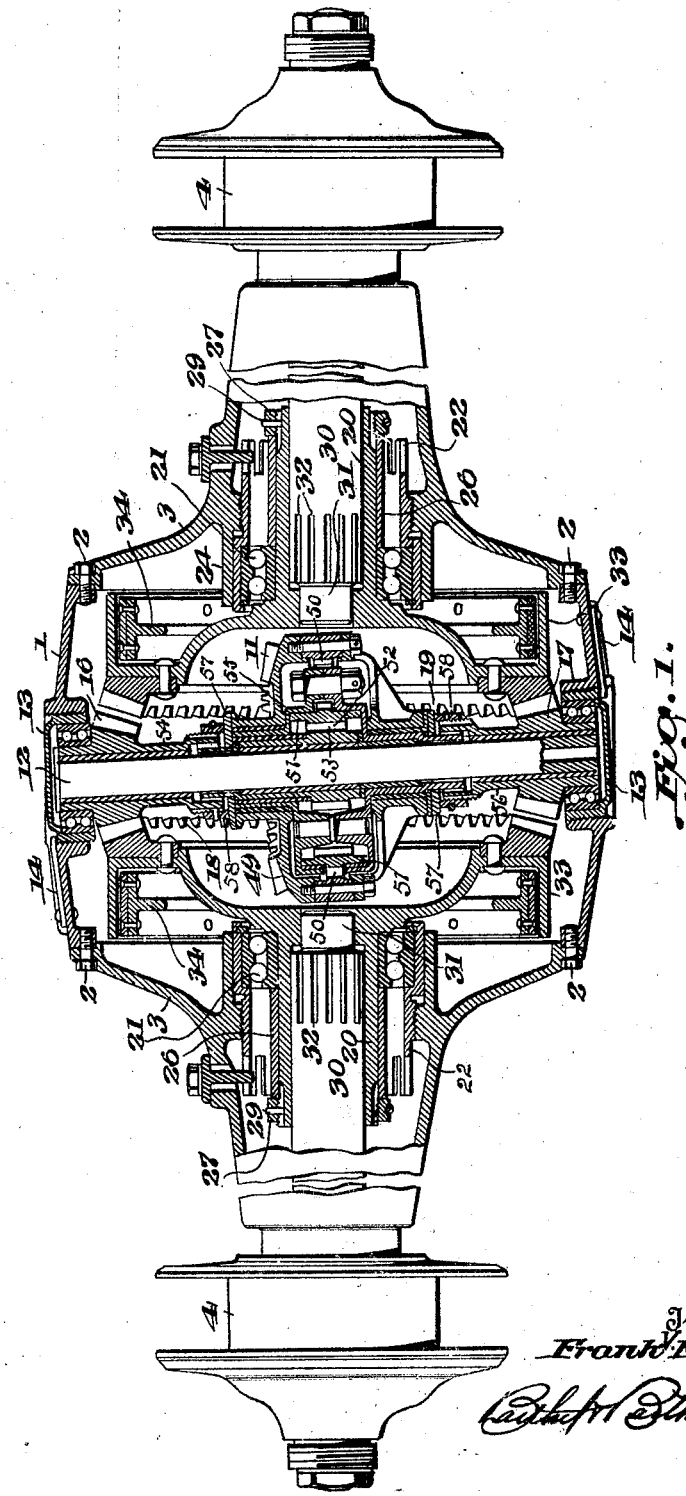

Patented May 11, 1926.

1,584,359

UNITED STATES PATENT OFFICE.

FRANK V. ELBERTZ, OF DETROIT, MICHIGAN, ASSIGNOR OF ONE-HALF TO B. F. EVERITT COMPANY, OF DETROIT, MICHIGAN, A CORPORATION OF MICHIGAN.

AUTOMOBILE DRIVING GEAR.

Application filed January 27, 1919. Serial No. 273,285.

In the construction and operation of the axle driving mechanism of automobiles and more particularly of the gearing connecting the propeller shaft with the differential mechanism which operates the two parts of the wheel shafts proper, it is inexpedient when ordinary types of differential and assembly are used to provide more than a single reduction in the connections because of the bulkiness of the ordinary type of differential and the difficulty of housing it properly. In the ordinary forms of differential drive it is customary to apply the brakes directly to each traction wheel and as a consequence when either shaft is fractured the car is rendered powerless.

This invention relates to an automobile driving gear wherein a double reduction is obtained in the ordinary housing of the rear axle, without impairing the accessibility of the parts, while braking means are also employed, completely concealed from the weather and so disposed that if either of the wheel shafts break, the differential may be made to drive the remaining shaft. Certain features of adjustment coupled with simplicity of construction are also incorporated in the device.

The invention consists in the matters hereinafter set forth and more particularly pointed out in the appended claims.

Figure 2:
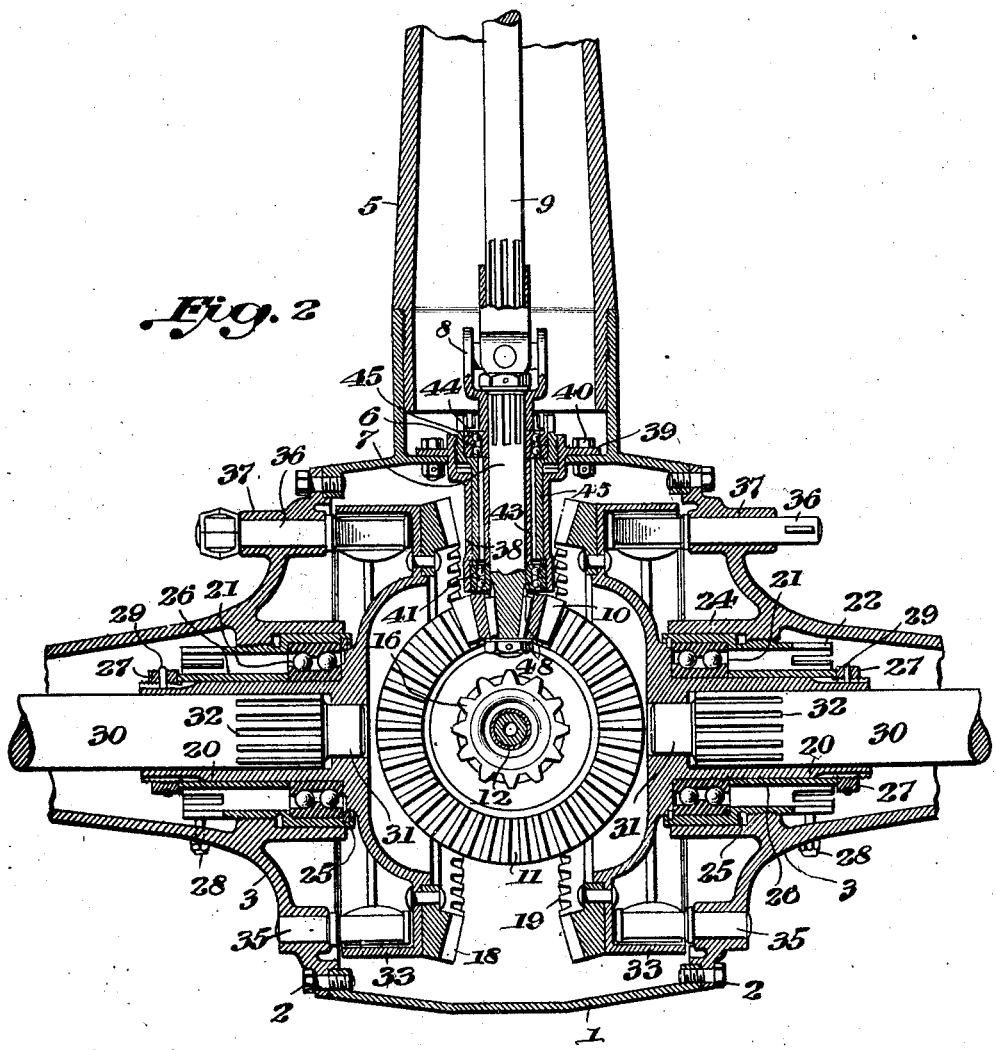

In the drawings,

Figure 1 is a longitudinal vertical section of an axle housing and driving mechanism that embodies features of the invention; and Fig. 2 is a view in longitudinal section, with parts in elevation.

In the drawings, a differential casing 1 is secured by studs 2 or other appropriate means to oppositely extending tubular sleeves 3 which together with the casing constitute a rear axle housing and are fitted at the outer end portions for the reception of wheel hubs 4 of any preferred type. There may be a torque tube 5 extending forwardly from the housing but at any rate there is a suitable bearing 6 in which a pinion shaft 7 is journaled which is connected by a universal joint 8 to a main propeller shaft 9. A beveled pinion 10 on the inner end of the pinion shaft meshes with the driving gear 11 of a differential mechanism which is journaled as a whole on an upright pin 12. As herein shown this differential is of the type described and illustrated in my Patent No. 1,282,783, dated October 21, 1918, although it may be of any other form that is suitable to operate within the limited space afforded.

A pair of oppositely disposed bearing caps 13 support the pin 12, being screwthreaded into or otherwise suitably secured in openings of the casing 1. Lock spring fingers 14 engaging the fluted faces of the caps hold the latter in adjusted position. The bearings of the caps 13 are so proportioned and disposed that the pin 12 is slightly oblique to the axis of the axle housing whereby the take-off beveled pinions 16 and 17 that are respectively operated by the follower or driven members of the differential gearing, mesh, the one with a beveled gear 18 and the other with a beveled gear 19. The latter have extension hubs 20 which are journaled in bearings 21 carried by adjusting sleeves 22 which are screwthreaded into the inwardly projecting barrels 24 of the members 3.

Obviously these bearings may be of any preferred type but for ease of endwise adjustment the form herein shown is preferable wherein the bearing 21 is carried in an outer sleeve 25 screwthreaded into the housing with an inner stop bushing 26 and adjusting collar 27 screw threaded on to the hub 20. A locking stud 28 and pin 29 hold these parts in adjusted position and permit the bodily shifting of the gears 18 and 19 axially.

The wheel hubs 4 and the companion gears 18 and 19 are connected by driving shaft sections 30 each entering the hub of the companion gear with a pilot portion 31 and suitable spline or key driving connections 32.

The gears 18 and 19 carry drums 33 for internal expanding brake shoes 34 which are pivoted on studs 35 passing through the housing and are operated independently by cam pins 36 likewise journaled in bosses 37 of the housing.

While the bearing of the shaft 7 may be of any appropriate type, the form herein disclosed is preferable as its affords accurate endwise adjustment of the pinion 10 so that it may be made to mesh properly with the driven gear of the differential. The outer barrel 38 secured by a flange 39 and holding bolts 40 to the differential housing has a counterbored inner end portion in which the races of a ball bearing 41 are mounted. A spreader or spacer 43 in the form of a sleeve on the shaft, spaces this bearing from another bearing 44, the raceway of which bearing is mounted in the counterbored outer end portion of an adjusting bushing 45 screwthreaded into an enlarged outer end portion of the barrel 38. A thrust collar 48 between the raceways of the bearing 41 holds the parts so that axial movement of the adjusting bushing 45 in or out of the barrel carries the shaft 7 and pinion 10 bodily and axially as desired.

In the form of differential mechanism, proper, referred to, and as herein illustrated, the beveled pinion 10 drives a casing 49 which is journaled on the pin 12. An inner annular gear 50 concentric with the pin and made fast to the casing, meshes with a compound gear 51, the inner teeth 52 of which engage a pinion 53 connected to the inwardly extended hub portion 54 of the pinion 16. The compound gear is journaled to rotate in a casing 55, which is eccentric to the pin 12 and when it revolves around the latter drives the other pinion 17 to the inwardly extending hub portion 56 of which it is connected, all as described in my patent hereinbefore referred to. Suitable endwise adjustment of the differential as a whole on the pin 12 to afford proper meshing of the gear 11 with the pinion 10 is afforded by interposing thrust washers 57 between the ends of the casing 49 and adjusting collars 58 on the ends of the hubs 54 and 56.

In operation the propeller shaft 9 drives the differential through one gear reduction (10, 11) and the differential mechanism in turn drives the wheel shafts through a second gear reduction (16, 18 and 17, 19). The parts are so designed and arranged as to be readily adjustable, and the pinions 16 and 17 as well as the drive pinion 10 are removable through the openings afforded by the construction of the axle housing, the mechanism thus being readily taken down for inspection and repairs.

Another feature is the application of the brake to the take-off gears of the differential instead of at the wheel ends of the shafts, and thus, if one of the wheel shafts should fracture the corresponding brake may be set and the car driven through the other wheel.

Obviously, changes in the details of construction and arrangement of parts may be made without departing from the spirit of the invention and I do not therefore limit myself to the particular form or arrangement shown.

What I claim is:—

1. In an automobile driving gear, a pair of axially alined shafts, a pair of oppositely disposed beveled gears on the proximate end portions thereof, a differential gearing between the gears including a pair of take off pinions in axial alinement each in mesh with a beveled gear, and means for adjusting the gears axially into cooperative relation with the pinions, said means including an annular member adjustable relative to the gear housing, and a member adjustable relative to a bevel gear, said members both overlying the gear hub.

2. In an automobile driving gear, a pair of axially alined shafts, a pair of oppositely disposed beveled gears on the proximate end portions thereof, differential gearing rotatable as a unit between the gears on a shaft oblique to the axis of the gears, a pair of take-off pinions concentric with the oblique axis of the gearing each in mesh with a beveled gear, and means affording adjustment of the beveled gear axially into proper cooperating relation with the pinions, said means including an annular member adjustable relative to the gear housing, and a member adjustable relative to a bevel gear, said members both overlying the gear hub.

3. In an automobile driving gear, an axle housing, a pair of axially alined shafts rotatable therein, a pair of oppositely disposed beveled gears on the proximate end portions of the shafts, differential gearing rotatable in the housing between the gears on a shaft oblique to the axis of the other shafts, a pair of take-off pinions concentric with the differential gearing axis of rotation each in mesh with a beveled gear, and bearings in the housing for the shafts each adjustable axially to shift the gears axially, said bearings including an annular member adjustable relative to the gear housing, and a member adjustable relative to a bevel gear, said members both overlying the hub of such gear.

In testimony whereof I affix my signature.

FRANK V. ELBERTZ.